2,886,555

NEW COMPOSITION OF MATTER AND PROCESS FOR PRODUCING SAME

Wilhelm Bunge, Leverkusen, Karl-Heinz Mielke, Koln-Stammheim, and Friedrich Möller, Leverkusen, Germany, assignors to Farbenfabriken Bayer Aktiengesellschaft, Leverkusen, Germany, a corporation of Germany No Drawing. Application July 26, 1955
Serial No. 524,582

2 Claims. (Cl. 260—63)

This invention relates to new compositions of matter and to a process for preparing same.

In the production of mixtures of polyisocyanates and polyhydroxy compounds which are stable at ordinary temperature, it is known to use polyisocyanates the reactive groups of which are blocked by reaction with monofunctional compounds; these compounds are generally known as masked polyisocyanates. Such products are described in Annalen, volume 562, pages 205–229. Under the action of relatively high temperatures they split up again the form the initial substances, and the isocyanate groups liberated are in turn able to react with the polyhydroxy compounds present in the reaction mixture. The cleavage temperature necessary depends upon the chemical nature of these masked polyisocyanate compounds and is usually between 150 and 200° C. For many purposes, such as in lacquers, impregnations, adhesives, and coatings, these temperatures are too high, since they cannot be maintained without resulting in damage to the other concurrently used materials, which are often of an organic nature.

By the addition of amino compounds, more especially tertiary amines, however, it is possible to substantially reduce these stoving or cleavage temperatures, but such additives, particularly in the presence of compounds which react with isocyanates, act on the masked polyisocyanate, even in the cold, causing the mono-functional compound to be split off after a short time, even at ordinary temperature, and thus make the mixture unstable.

It has now been found that it is possible to obtain mixtures of masked polyisocyanates with polyhydroxy compounds, which can be stored almost indefinitely and react at substantially lower temperatures, usually 50 to 80° C. lower than usual, by adding substances having a neutral or slightly acid reaction at room temperature which split off basic substances, such as more especially amines, when the temperature is raised and thereby catalyse the cleavage of the masked polyisocyanates at this elevated temperature.

Substances which act in the manner described are salts of organic mono- and polycarboxylic acids with tertiary amines or polyamines which have at least one tertiary nitrogen atom, and also those slightly acid reaction products of amines, including ammonia, with aldehydes or ketones, such as, for example, hexamethylene tetramine or Schiff's bases. 1 to 5 parts of these catalysts are used to each 100 parts of polyester.

The invention is illustrated but not limited by the following examples, the parts being by weight:

Example 1

73 parts of a reaction product of 1 mol of toluylene diisocyanate with 2 mols of phenol, prepared by heating for 2 hours at 150° C., and 100 parts of a polyester prepared from 3 mols of adipic acid, 3 mols of hexanediol and 1 mol of hexanetriol by thermal condensation at 150 to 220° C., are dissolved in ethyl acetate and mixed with 3.5 parts of the acetic acid salt of hexahydro-dimethyl aniline. The resulting solution is suitable for impregnating electric motors and coils, for example. Temperatures of 110–125° C. are necessary for stoving purposes.

Example 2

435 parts of a 20% solution of the reaction product of 1 mol of triphenyl-methane triisocyanate with 3 mols of phenol, prepared by heating for 2 hours at 150° C., are mixed with a solution of 100 parts of the polyester described in Example 1 in ethyl acetate/butyl acetate/toluene (1:1:1) and with 4 parts of the adipic acid salt of hexahydrodimethyl aniline. A sheet of unvulcanised rubber coated with this lacquer produces a smooth firmly bonded coating after vulcanisation has been carried out at 125° C. The lacquer can be kept indefinitely at room temperature.

Example 3

1 mol of toluylene diisocyanate is reacted with 2 mols of o-cresol by heating for two hours at 150° C. 135 parts of this reaction product are dissolved in butyl acetate and ethyl acetate (1:1) with 100 parts of a polyester prepared from 2 mols of adipic acid, 1 mol of phthalic acid and 4 mols of hexanetriol by thermal condensation at 150 to 220° C. This solution is mixed in the ratio of 4:1 with one part of a solution of the anil of α-ethyl-β-propyl acrolein in glacial acetic acid. The stoving temperature is 120 to 130° C.

Example 4

1 mol of hexamethylene diisocyanate is reacted with 2 mols of phenol by heating for 2 hours at 150° C. 165 parts of the reaction product are mixed with 100 parts of a polyester of 3 mols of adipic acid, 2 mols of butanediol, and 2 mols of hexanetriol, prepared by thermal condensation at 150–220° C. and dissolved in glacial acetic acid/toluene/methyl glycol acetate (1:1:1). 3 parts of the benzoic acid salt of N-pentamethyldiethylene triamine are added to this solution. The reaction temperature of the mixture is lowered to 110–125° C. by means of this addition. At these temperatures, it is possible to obtain a satisfactorily elastic impregnation of textile fabrics and paper webs. After evaporation of the solvent, this product is also suitable for bonding together such fabrics or paper webs to form laminated materials by the action of pressure and heat.

Example 5

The solution of masked diisocyanate and polyester mentioned in Example 4 is mixed with 5 parts of hexamethylene tetramine, whereby hardening is possible at temperatures between 120–130° C.

Example 6

73 parts of a reaction product of 1 mol of toluylene diisocyanate with 2 mols of phenol, prepared by heating for 2 hours at 150° C., and 95 parts of a branched polythioether with 6.6% hydroxyl groups prepared from 854 parts of thiodiglycol, 360 parts of 1,4-butylene glycol, 948 parts of 4,4'-bis-oxethoxy-diphenyl-dimethyl methane and 586 parts of trimethylol propane by thermal condensation at 160–170° C., are mixed and dissolved in ethyl acetate. To this mixture 3.5 parts of the acetic acid salt of hexahydrodimethyl aniline are added. The resulting solution is suitable for impregnating electric motors and coils, for example. Temperatures of 110–125° C. are necessary for stoving purposes.

Example 7

The masked diisocyanate mentioned in Example 6 is mixed with 125 parts of a hydrogenated polymerisation product of carbon monoxide and ethylene (5% hydroxyl groups) and the mixture dissolved in ethyl acetate. To this mixture 3.5 parts of the acetic acid salt of hexahydrodimethyl aniline are added. The resulting solution is suitable for impregnating electric motors and coils, for example. Temperatures of 110–125° C. are necessary for stoving purposes.

What is claimed is:

1. As a new composition of matter, a mixture containing in substantial amounts the addition product of an organic polyisocyanate and a phenol, a predominantly hydroxyl terminated organic compound selected from the group consisting of a polyester prepared by esterification of a dicarboxylic acid and an excess of a polyhydric alcohol, a polyether produced by condensation of polyhydric alcohols as the sole hydroxyl containing reactive ingredients, and the polymeric hydrogenated condensation product of ethylene and carbon monoxide, and a precursor of a catalyst which splits when heated to a temperature below 150° C. to form the catalyst, said precursor being selected from the group consisting of (1) salts prepared from a carboxylic acid and a tertiary amine free from groups reactive with an isocyanate, (2) the reaction product of an amine with a compound selected from the group consisting of an aldehyde and a ketone, and (3) the reaction product of ammonia with a compound selected from the group consisting of an aldehyde and a ketone.

2. The composition of claim 1 wherein said predominantly hydroxyl terminated organic compound is a polyester prepared by esterification of a dicarboxylic acid and an excess of a polyhydric alcohol.

References Cited in the file of this patent

UNITED STATES PATENTS

| | | |
|---|---|---|
| 2,650,212 | Windemuth | Aug. 25, 1953 |
| 2,692,874 | Langerak | Oct. 26, 1954 |
| 2,779,689 | Reis | Jan. 29, 1957 |

FOREIGN PATENTS

| | | |
|---|---|---|
| 150,416 | Australia | Mar. 5, 1953 |
| 712,053 | Great Britain | July 14, 1954 |
| 731,071 | Great Britain | June 1, 1955 |

OTHER REFERENCES

Bayer: Modern Plastics, June 1947, pages 149–152, 250, 252, 254, 256, 258, 260, 262.